US008702943B2

(12) United States Patent
December et al.

(10) Patent No.: US 8,702,943 B2
(45) Date of Patent: Apr. 22, 2014

(54) ELECTROCOAT COMPOSITION AND PROCESS REPLACING PHOSPHATE PRETREATMENT

(75) Inventors: Timothy S December, Rochester Hills, MI (US); Abdellatif Chouai, Lake Jackson, MI (US); Cynthia A Stants, Pinckney, MI (US)

(73) Assignee: BASF Coatings GmbH, Münster (DE)

( * ) Notice: Subject to any disclaimer, the term of this patent is extended or adjusted under 35 U.S.C. 154(b) by 519 days.

(21) Appl. No.: 12/344,753

(22) Filed: Dec. 29, 2008

(65) Prior Publication Data
US 2010/0166973 A1 Jul. 1, 2010

(51) Int. Cl.
*C25D 13/06* (2006.01)
*C08G 59/42* (2006.01)

(52) U.S. Cl.
USPC ............ 204/506; 204/504; 204/510; 528/108

(58) Field of Classification Search
USPC .................. 524/599, 539; 204/504, 506, 510; 528/108
See application file for complete search history.

(56) References Cited

U.S. PATENT DOCUMENTS

| | | |
|---|---|---|
| 2,723,971 A | 11/1955 | Cupery |
| 3,400,102 A | 9/1968 | Ludington |
| 3,564,074 A | 2/1971 | Avallone |
| 4,164,487 A | 8/1979 | Martin |
| 4,289,812 A | 9/1981 | Martin |
| 4,321,335 A | 3/1982 | Arimoto et al. |
| 4,397,970 A | 8/1983 | Campbell et al. |
| 4,425,451 A | 1/1984 | Sekmakas et al. |
| 4,439,593 A | 3/1984 | Kelso et al. |
| 4,461,857 A | 7/1984 | Sekmakas et al. |
| 4,487,859 A | 12/1984 | Martino |
| 4,508,765 A | 4/1985 | Ring et al. |
| 4,600,754 A | 7/1986 | Winner |
| 4,692,484 A | 9/1987 | Roberts |
| 4,734,467 A | 3/1988 | Yamada et al. |
| 4,761,337 A | 8/1988 | Guagliardo et al. |
| 4,968,730 A | 11/1990 | Honig et al. |
| 4,968,775 A | 11/1990 | Toman et al. |
| 4,992,516 A | 2/1991 | Schipfer et al. |
| 4,992,525 A | 2/1991 | Kriessmann et al. |
| 5,086,156 A | 2/1992 | McGrath et al. |
| 5,095,050 A | 3/1992 | Treybig et al. |
| 5,130,350 A | 7/1992 | Schwerzel et al. |
| 5,132,378 A | 7/1992 | Schipfer et al. |
| 5,141,815 A | 8/1992 | Rickett |
| 5,264,469 A | 11/1993 | Mysliwczyk et al. |
| 5,342,901 A | 8/1994 | Kogure et al. |
| 5,380,816 A | 1/1995 | Sullivan |
| 5,389,704 A | 2/1995 | Yabu |
| 5,554,700 A | 9/1996 | Schipfer et al. |
| 5,556,913 A | 9/1996 | Tobinaga et al. |
| 5,635,049 A | 6/1997 | Mysliwczyk et al. |
| 5,670,441 A | 9/1997 | Foedde et al. |
| 5,726,249 A | 3/1998 | Barsotti et al. |
| 5,817,733 A | 10/1998 | Rink |
| 5,859,095 A | 1/1999 | Moyle et al. |
| 5,866,259 A | 2/1999 | Harris et al. |
| 5,908,912 A | 6/1999 | Kollah et al. |
| 5,972,189 A | 10/1999 | McMurdie et al. |
| 5,975,874 A | 11/1999 | Daly et al. |
| 6,025,438 A | 2/2000 | Hinterwaldner et al. |
| 6,110,341 A | 8/2000 | McMurdie et al. |
| 6,174,422 B1 | 1/2001 | Hönig et al. |
| 6,190,524 B1 | 2/2001 | Kollah et al. |
| 6,265,079 B1 | 7/2001 | Nishiguchi et al. |
| 6,319,988 B1 | 11/2001 | Barkac et al. |
| 6,333,367 B1 | 12/2001 | Kato et al. |
| 6,353,057 B1 | 3/2002 | He et al. |
| 6,436,201 B1 | 8/2002 | Sugita et al. |
| 6,492,027 B2 | 12/2002 | Nishiguchi et al. |
| 6,599,965 B2 | 7/2003 | Lane et al. |
| 6,617,030 B2 | 9/2003 | Morishita et al. |
| 6,624,215 B1 | 9/2003 | Hiraki et al. |
| 6,750,274 B2 | 6/2004 | Jones et al. |
| 6,777,034 B2 | 8/2004 | Berger et al. |
| 6,809,160 B2 | 10/2004 | Tsuboniwa et al. |
| 6,852,824 B2 | 2/2005 | Schwarte et al. |
| 6,887,526 B1 | 5/2005 | Arlt et al. |
| 6,897,265 B2 | 5/2005 | Algrim et al. |
| 6,942,902 B2 | 9/2005 | Sapper |
| 6,994,888 B2 | 2/2006 | Metcalfe |
| 7,030,185 B2 * | 4/2006 | Tominaga et al. ............ 524/591 |
| 7,081,157 B2 | 7/2006 | Maze et al. |

(Continued)

FOREIGN PATENT DOCUMENTS

| | | |
|---|---|---|
| DE | 2918610 A1 | 11/1980 |
| DE | 4408865 A1 | 9/1995 |

(Continued)

OTHER PUBLICATIONS

International Search Report for co-pending Application No. PCT/US2009/068156 mailed Jun. 24, 2010.
International Search Report for co-pending Application No. PCT/US2009/068162 mailed Mar. 4, 2010.
International Search Report for co-pending Application No. PCT/US2009/058184 mailed Jan. 19, 2010.
International Search Report for co-pending Application No. PCT/US2009/050120 mailed Aug. 27, 2010.
International Search Report for co-pending Application No. PCT/US2009/048640 mailed Oct. 1, 2009.
Database WPI Week 198335, Thomson Scientific, London, 1983-750925; dated Jul. 26, 1983.

(Continued)

*Primary Examiner* — Kishor Mayekar
(74) *Attorney, Agent, or Firm* — Quinn Law Group, PLLC

(57) ABSTRACT

An aqueous electrodeposition coating composition comprising a cathodically electrodepositable binder, the binder comprising a phosphorylated resin and a carboxyl group separated by from 2 to 4 carbons from an ester group, provides corrosion protection equivalent to that obtained by the conventional phosphate pretreatment-electrodeposition coating process.

22 Claims, No Drawings

(56) References Cited

U.S. PATENT DOCUMENTS

| | | |
|---|---|---|
| 7,087,146 B2 | 8/2006 | Grosse-Brinkhaus et al. |
| 7,163,979 B2 | 1/2007 | Okazaki et al. |
| 7,268,171 B2 | 9/2007 | Tanaka et al. |
| 7,300,963 B2 | 11/2007 | Birnbrich et al. |
| 7,345,101 B2 | 3/2008 | Pawlik et al. |
| 2003/0004231 A1 | 1/2003 | Ehmann et al. |
| 2004/0014870 A1 | 1/2004 | Tominaga et al. |
| 2004/0071972 A1 | 4/2004 | Nakajima et al. |
| 2005/0065243 A1 | 3/2005 | Feola et al. |
| 2005/0256260 A1 | 11/2005 | Ohrbom et al. |
| 2006/0025497 A1 | 2/2006 | Ushirogouchi et al. |
| 2006/0058423 A1 | 3/2006 | Gros et al. |
| 2006/0127678 A1 | 6/2006 | Pawlik et al. |
| 2006/0261311 A1 | 11/2006 | Poulet et al. |
| 2007/0149655 A1 | 6/2007 | Kawaraya et al. |
| 2007/0244270 A1 | 10/2007 | December et al. |
| 2007/0275256 A1 | 11/2007 | Ragunathan et al. |
| 2008/0102214 A1 | 5/2008 | December et al. |
| 2008/0103268 A1 | 5/2008 | December et al. |
| 2008/0103269 A1 | 5/2008 | December et al. |
| 2008/0193664 A1 | 8/2008 | Gonzalez et al. |
| 2008/0194783 A1 | 8/2008 | Gonzalez et al. |
| 2008/0194843 A1 | 8/2008 | Gonzalez et al. |

FOREIGN PATENT DOCUMENTS

| | | |
|---|---|---|
| EP | 0230292 | 7/1987 |
| EP | 0288942 | 11/1988 |
| EP | 0304834 A2 | 3/1989 |
| EP | 0680988 A2 | 11/1995 |
| JP | 56062830 | 5/1981 |
| JP | 58125760 | 7/1983 |
| JP | 4091170 | 3/1992 |
| JP | H05320568 A | 12/1993 |
| JP | 08-053644 | 2/1996 |
| JP | 2001098225 A | 4/2001 |
| JP | 0269367 | 3/2002 |
| JP | 2002161126 A | 6/2002 |
| JP | 2002201410 | 7/2002 |
| JP | 2002327040 A | 11/2002 |
| JP | 2003129005 | 5/2003 |
| JP | 2003226982 | 8/2003 |
| JP | 2004051686 A | 2/2004 |
| JP | 2007191686 A | 8/2007 |
| WO | WO 96/00755 | 1/1996 |
| WO | WO 00/47642 | 8/2000 |
| WO | WO 01/44382 | 6/2001 |
| WO | WO 02/051949 A2 | 7/2002 |
| WO | WO 2007/117900 A2 | 10/2007 |
| WO | WO 2008/127744 | 10/2008 |

OTHER PUBLICATIONS

Kaliyappan, T. et al., "Co-ordination polymers," Progress in Polymer Science, 25 (2000) 343-370.

Kaliyappan, T. et al., "Synthesis and characterization of a new metal chelating polymer and derived Ni (II) and Cu (II) polymer complexes," Polymer, Elsevier Science Publishers, B.V., GB, vol. 37, No. 13, pp. 2865-2869, 1996.

Singh a. et al., "Towards achieving selectivity in metal ion binding by fixing ligand-chelator complex geometry in polymers," Reactive & Functional Polymers, 44 (2000) 79-89.

Tang et al., "The coiled coils in the design of protein-based constructs: hybrid hydrogels and epitope displays," Journal of Controlled Release 72 (2201) 57-50.

Yang, Li Qun et al., "Studies on Coordination-Crosslinking of Soap-Free Polyacrylate Hydrosol and Metal Ion," J. Appl. Polym. Sci., Dec. 26, 1997, John Wiley & Sons Inc., New York, NY vol. 66, No. 13, pp. 2457-2463, XP002474955.

* cited by examiner

US 8,702,943 B2

ELECTROCOAT COMPOSITION AND PROCESS REPLACING PHOSPHATE PRETREATMENT

FIELD OF THE DISCLOSURE

The invention relates to coatings for metal substrates, particularly electrocoat coating compositions, methods of preparing them, methods of coating metal substrates, particularly electrodeposition of coatings onto a conductive substrate, and coated metal substrates.

BACKGROUND OF THE DISCLOSURE

The statements in this section merely provide background information related to this disclosure and may not constitute prior art.

Industrial coating of metal articles that will be used in corrosive environments may include application of one or more inorganic and organic treatments and coatings. Painting systems ("paint shops") in automotive assembly plants are large, complex, and expensive. Metal automotive vehicle bodies (the "body-in-white") and parts, for instance, are given a many-step treatment of cleaning in one or more cleaning baths or spray tanks, application of an aqueous phosphate coating material as a metal pretreatment step in a phosphating bath, then various rinses and additional finishing treatments, such as described in Claffey, U.S. Pat. No. 5,868,820. The phosphating pre-treatment steps are undertaken to improve corrosion resistance of the metal and adhesion of subsequent coatings to the metal. The cleaning and phosphating steps may have 10 or 12 individual treatment stations of spray equipment or dip tanks.

An electrodeposition coating ("electrocoat") is applied after the pretreatment steps to the metal vehicle body. Electrocoat baths usually comprise an aqueous dispersion or emulsion of a principal film-forming epoxy resin ("polymer" and "resin" are used interchangeably in this disclosure), having ionic stabilization in water or a mixture of water and organic cosolvent. In automotive or industrial applications for which durable electrocoat films are desired, the electrocoat compositions are formulated to be curable (thermosetting) compositions. This is usually accomplished by emulsifying with the principal film-forming resin a crosslinking agent that can react with functional groups on the principal resin under appropriate conditions, such as with the application of heat, and so cure the coating. During electrodeposition, coating material containing the ionically-charged resin having a relatively low molecular weight is deposited onto a conductive substrate by submerging the substrate in the electrocoat bath and then applying an electrical potential between the substrate and a pole of opposite charge, for example, a stainless steel electrode. The charged coating material migrates to and deposits on the conductive substrate. The coated substrate is then heated to cure or crosslink the coating.

One of the advantages of electrocoat compositions and processes is that the applied coating composition forms a uniform and contiguous layer over a variety of metallic substrates regardless of shape or configuration. This is especially advantageous when the coating is applied as an anticorrosive coating onto a substrate having an irregular surface, such as a motor vehicle body. The even, continuous coating layer over all portions of the metallic substrate provides maximum anticorrosion effectiveness. The phosphate pre-treatment, however, has up to now been an indispensable step in protecting against corrosion for automotive vehicle bodies. McMurdie et al., U.S. Pat. No. 6,110,341 teaches that hydrocarbyl phosphate and phosphonic acid esters, which may include polyepoxide linking groups, can be incorporated into electrodeposition baths in amounts of up to 500 ppm on total bath weight for improved corrosion protection. Examples including phenylphosphonic acid were reported to have a modest increase in corrosion protection over untreated steel panels. December et al., U.S. Patent Application Publication No. 2008/0102214, 2008/0103268, and 2008/0103269 disclose that coating adhesion to a coated metal substrate can be improved by including in a film-forming component (e.g., crosslinkable resin or crosslinker) nonionic metal coordinating structure. U.S. Patent Application Publication No. 2007/0244270 disclose a polymeric ligand prepared by reacting hydroxyl-functional resin or crosslinked with a cyclic anhydride incorporated in a coating to complex a metal catalyst to more easily and effectively incorporate the metal catalyst. Improved cure response, chip resistance, and corrosion inhibition are reported.

SUMMARY OF THE DISCLOSURE

We disclose a composition and process for electrodepositing an electrocoat coating on an unphosphated metal substrate (that is, a metal substrate that has not undergone a phosphate pretreatment) in which the electrocoat coating provides excellent corrosion protection. Elimination of the steps and equipment for the phosphating pretreatment process permits a major cost savings in construction of a new paint shop, as well as a simplification and cost savings in operating paint shops now in automotive manufacturing plants. A carboxylate group in proximity to an ester group on the binder, which may be produced by reaction of a hydroxyl group on the binder with a cyclic anhydride, unexpectedly enhances the effectiveness of phosphate or phosphonic acid ester groups of the binder in corrosion protection of a metal substrate by its interaction with the metal substrate surface.

The composition and process use an aqueous electrocoat coating composition, also called an electrocoat bath, with a binder comprising a carboxylate group separated by 2 to 4 carbons from an ester group, such as monoester of a cyclic anhydride, and a resin having at least one phosphorous-containing group

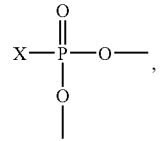

in which X is a hydrogen, a monovalent hydrocarbon group (i.e., hydrocarbyl group), an alkyl group such as an aminoalkyl group, an aryl group, an alkylaryl group, an arylalkyl group, or an oxygen atom having a single covalent bond to the phosphorous atom, and each oxygen atom has a covalent bond to a hydrogen atom, an alkyl group, an aryl group, an alkylaryl group, an arylalkyl group, or the resin, with the caveat that at least one oxygen atom has a covalent bond to the resin. The alkyl groups may be cycloalkyl groups and may be hydrocarbyl groups or may include heteroatoms. For convenience, "resin" is used in this disclosure to encompass resin, oligomer, and polymer, and the resin having the phosphorous-containing group will be referred to as a phosphorylated resin. The carboxylate group separated by two to four carbons from an ester group (e.g., monoester of a cyclic anhydride) may be a part of the phosphorylated resin or may be a part of a second resin, including a crosslinker resin having groups that react during cure with the phosphorylated resin. For convenience, this group may be referred to either as "the carboxylate/ester group" or as its particular embodiment of a "monoester of a cyclic anhydride." "Binder" refers to the film-forming components of the coating composition. Typically the binder is thermosetting or curable, and, after curing, the phosphorous-containing group and the monoester of a cyclic anhydride are a part of a crosslinked network. Thus, both the phosphorylated resin and binder resin bearing the carboxylate/ester group (if different from the phosphorylated resin) have at least one crosslinkable group that reacts during curing of the coating composition to become part of the cured binder.

In various embodiments, the carboxylate/ester group may have a structure

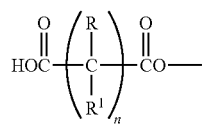

in which n is 2, 3, or 4 and each of R and $R^1$ is independently selected from H and alkyl groups having one to four carbon atoms. In certain embodiments each of R and $R^1$ is independently selected from H and hydrocarbyl groups having one to four carbon atoms.

In various embodiments, the phosphorous-containing group is a monoester of phosphoric or phosphonic acid. In other embodiments, the phosphorous-containing group is diester of phosphoric or phosphonic acid. In still other embodiments, the phosphorous-containing group is diester of phosphoric acid. In various embodiments, the phosphorylated resin has some combination of these phosphorous containing groups. The phosphorylated resin may have one or a plurality of the phosphorous-containing groups. In addition, there may be one or a plurality of the metal coordinating groups present in the binder, as a part of the phosphorylated resin, a part of a second resin, a part of the crosslinker, or a part of more than one of these.

In one embodiment, the phosphorylated resin comprises a monophosphate ester or monophosphonic acid ester of a polyepoxide resin. In another embodiment, the phosphorylated resin comprises a diphosphate ester or diiphosphonic acid ester of a polyepoxide resin. In another embodiment, the phosphorylated resin comprises a triphosphate ester. In other embodiments, the phosphorylated resin includes a combination of these esters. The remaining oxygens on the phosphorous atom that are not covalently bound between the resin and the phosphorous atom may be esterified by alkyl or aryl groups. In certain embodiments, at least one P—OH group remains unesterified.

In various embodiments, the phosphorylated resin has one phosphorous atom or a plurality of phosphorous atoms. The phosphorylated resin may be prepared using a polyepoxide extended by reaction with one or more extenders, with an extender having at least two active hydrogen-containing groups.

In certain embodiments, the binder comprises a crosslinker for the phosphorylated resin. The crosslinker may include the carboxyl/ester group or monoester of a cyclic anhydride, or the monoester of a cyclic anhydride may be a part of a further resin reactive with the crosslinker during cure. In certain embodiments, the binder comprises a second resin that is an amine-functional resin. The second resin, the crosslinker, or the phosphorylated resin may have the monoester of a cyclic anhydride. The binder may also comprise a crosslinker that reacts during cure of the electrodeposited coating layer with the phosphorylated resin, the second amine-functional resin, or both. The crosslinker may have the monoester of a cyclic anhydride.

In various embodiments, the phosphorylated resin is an amine-functional phosphorylated resin. In certain embodiments, the amine-functional phosphorylated resin comprises from about 0.01 to about 99% by weight of binder in the electrodeposition coating composition. The amine-functional phosphorylated resin may include a monoester of a cyclic anhydride, or the monoester of a cyclic anhydride may be a part of another binder resin (which may be a crosslinker resin). Among these embodiments are those in which the amine-functional phosphorylated resin is from about 1 to about 90% by weight of total binder in the electrodeposition coating composition and those in which the amine-functional phosphorylated resin is from about 5 to about 80% by weight of total binder in the electrodeposition coating composition. In certain embodiments, the binder comprises a crosslinker for the amine-functional phosphorylated resin, and the crosslinker may include the monoester of a cyclic anhydride. In certain embodiments, the binder comprises a second amine-functional resin other than the amine-functional phosphorylated resin, and the second amine-functional resin may have the monoester of a cyclic anhydride. In any of these embodiments, the binder may also comprises a crosslinker which reacts during cure of the electrodeposited coating layer with the amine-functional phosphorylated resin, the second amine-functional resin, or both.

A method of coating an electrically conductive substrate, such as a metal automotive vehicle body or part, comprises placing the electrically conductive substrate into the aqueous electrodeposition coating composition comprising a binder comprising the carboxylate/ester group and the phosphorous-containing group and, using the electrically conductive substrate as the cathode, passing a current through the aqueous electrodeposition coating composition to deposit a coating layer comprising the binder onto the electrically conductive substrate. In one embodiment, the binder is cathodically electrodepositable. The deposited coating layer may then be cured to a cured coating layer. Subsequent coating layers may be applied on the deposited (optionally cured) electrodeposited coating layer. For example, the electrodeposited coating layer may be a primer layer and other layers such as an optional spray-applied primer surfacer and a topcoat layer or topcoat layers (e.g., a colored basecoat layer and a clearcoat layer) may be applied over the electrodeposited coating layer.

In one embodiment of the method, the electrically conductive substrate is unphosphated before it is coated with the electrodeposited coating comprising the phosphorylated resin and the monoester of a cyclic anhydride; that is, the substrate is free of a phosphate pre-treatment.

In one embodiment of the method, a metal automotive vehicle body is cleaned, and the cleaned metal automotive vehicle body is electrodeposited with an aqueous coating composition comprising a phosphorylated resin and, as part of the phosphorylated resin or as part of a second resin, a carboxylate/ester group. Thus, no phosphate pretreatment is used. The phosphorylated resin may be electrodepositable. The binder of the electrocoat coating composition may include a further resin that is electrodepositable and that does not have phosphate groups, and generally the binder will include a crosslinker reactive with the resin(s) so that the electrodeposited coating layer may be cured. Any of the phosphorylated resin, a further electrodepositable resin, a different resin, or a crosslinker may have the carboxylate/ester group.

A coated electrically conductive substrate comprises a cured layer on the electrically conductive substrate, the cured layer formed from an electrically deposited coating layer comprising a binder comprising a monoester of a cyclic anhydride and a phosphorylated resin.

The phosphorous-containing groups on the phosphorylated resin protect the metal substrate from corrosion, while the carboxylate/ester groups enhance the effectiveness of the phosphorous-containing groups by forming a coordinate bond to the metal substrate. Because both the phosphorous-containing and carboxylate/ester groups are part of the coating binder, the carboxylate/ester groups unexpectedly enhance the action of the phosphorous groups in protecting the metal from corrosion.

"A," "an," "the," "at least one," and "one or more" are used interchangeably to indicate that at least one of the item is present; a plurality of such items may be present. Other than in the working examples provides at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range.

Further areas of applicability will become apparent from the description provided herein. It should be understood that the description and specific examples are intended for purposes of illustration only and are not intended to limit the scope of the present disclosure.

DETAILED DESCRIPTION

The following description is merely exemplary in nature and is not intended to limit the present disclosure, application, or uses.

A metal substrate, which may be unphosphated, is electrocoated with an aqueous electrocoat coating composition having a binder comprising a carboxyl group separated by 2 to 4 carbons from an ester group, such as monoester of a cyclic anhydride, and a phosphorylated resin. The electrodeposited coating layer may be cured and may be overcoated with one or more additional coating layers. The phosphorylated resin has at least one covalently bonded, phosphorous-containing group having a structure

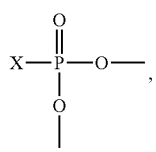

in which X is a hydrogen, a monovalent hydrocarbon group (i.e., hydrocarbyl group), an alkyl group such as an aminoalkyl group, an aryl group, an alkylaryl group, an arylalkyl group, or an oxygen atom having a single covalent bond to the phosphorous atom, and each oxygen atom has a covalent bond to a hydrogen atom, an alkyl group, an aryl group, an alkylaryl group, an arylalkyl group, or the resin, with the caveat that at least one oxygen atom has a covalent bond to the resin. The phosphorylated resin may also include the carboxylate/ester group, or the carboxylate/ester group may be a part of a second resin or of a crosslinker, as will be described in detail after the description of the phosphorylated resin.

The phosphorylated resin may be prepared using any resin or polymerizable monomer that may be esterified with the phosphorous-containing group. Electrocoat coating binders often include epoxy resins, and the phosphorylated resin may, for example, be an epoxy resin. The phosphorylated resin may be amine-functional so that it is cathodically electrodepositable itself (a "principal" resin), or it may be combined with a second resin that is an amine-functional resin (in which case the second resin would be a principal resin).

Suitable examples of resins and monomers that may be esterified with the phosphorous-containing group include those have epoxide or hydroxyl groups. The epoxide- and hydroxyl-functional resin or monomer is reacted with a —P(OR)$_2$=O group-containing acid or acid derivative, with at least one R being a hydrogen atom or a lower alkyl group (by which we mean an alkyl group having one to four carbon atoms), particularly methyl, ethyl, propyl, isopropyl, isobutyl, butyl, or tert-butyl, than can be transesterified, such as phosphoric acid, a mono- or diester of phosphoric acid, hypophosphoric acid, a monoester of hypophosphoric acid, alkyl- or arylphosphonic acid, a monoester of alkyl- or arylphosphonic acid, and combinations of these. Phosphoric acid or a source of phosphoric acid that used in the reaction may be nonaqueous phosphoric acid, 85% in water, a more dilute aqueous phosphoric acid, pyrophosphoric acid, or polyphosphoric acid. Other suitable phosphoric acid sources are described in Campbell et al., U.S. Pat. No. 4,397,970, incorporated herein by reference.

The epoxide- or hydroxyl-functional resin or monomer has at least one epoxide or alcohol group for reaction with the phosphorous-containing acid or acid derivative. For example, polyepoxide resins may be reacted with the phosphorous-containing acid or acid derivative. Suitable, nonlimiting examples of polyepoxide resins that may be reacted with the —P(OR)$_2$=O group-containing acid or derivative include epoxy resins with a plurality of epoxide groups, such as diglycidyl aromatic compounds such as the diglycidyl ethers of polyhydric phenols such as 2,2-bis(4-hydroxyphenyl)propane (bisphenol A), 2,2-bis(4-hydroxy-3-methylphenyl)propane, 4,4'-dihydroxybenzophenone, dihydroxyacetophenones, 1,1-bis(4hydroxyphenylene)ethane, bis(4-hydroxyphenyl)methane, 1,1-bis(4hydroxyphenyl)isobutane, 2,2-bis(4-hydroxy-tert-butylphenyl)propane, 1,4-bis(2-hydroxyethyl)piperazine, 2-methyl-1,1-bis(4-hydroxyphenyl)propane, bis-(2-hydroxynaphthyl)methane, 1,5-dihydroxy-3-naphthalene, and other dihydroxynaphthylenes, catechol, resorcinol, and the like, including diglycidyl ethers of bisphenol A and bisphenol A-based resins having a structure wherein Q is

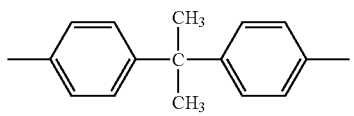

R is H, methyl, or ethyl, and n is an integer from 0 to 10. In certain embodiments, n is an integer from 1 to 5. Also suitable are the diglycidyl ethers of aliphatic diols, including the diglycidyl ethers of 1,4-butanediol, cyclohexanedimethanols, ethylene glycol, propylene glycol, diethylene glycol, dipropylene glycol, triethylene glycol, tripropylene glycol, polypropylene glycol, polyethylene glycol, poly(tetrahydrofuran), 1,3-propanediol, 2,2,4-trimethyl-1,3-pentanediol, 1,6-hexanediol, 2,2-bis(4-hydroxycyclohexyl)propane, and the like. Diglycidyl esters of dicarboxylic acids can also be used as polyepoxides. Specific examples of compounds include the diglycidyl esters of oxalic acid, cyclohexanediacetic acids, cylcohexanedicarboxylic acids, succinic acid, glutaric acid, phthalic acid, terephthalic acid, isophthalic acid, naphthalene dicarboxylic acids, and the like. A polyglycidyl reactant may be used, preferably in a minor amount in combination with diepoxide reactant. Novolac epoxies may be used as a polyepoxide-functional reactant. The novolac epoxy resin may be selected from epoxy phenol novolac resins or epoxy cresol novolac resins. Other suitable higher-functionality polyepoxides are glycidyl ethers and esters of triols and higher polyols such as the triglycidyl ethers of trimethylolpropane, trimethylolethane, 2,6-bis(hydroxymethyl)-p-cresol, and glycerol; tricarboxylic acids or polycarboxylic acids. Also useful as polyepoxides are epoxidized alkenes such as cyclohexene oxides and epoxidized fatty acids and fatty acid derivatives such as epoxidized soybean oil. Other useful polyepoxides include, without limitation, polyepoxide polymers such as acrylic, polyester, polyether, and epoxy resins and polymers, and epoxy-modified polybutadiene, polyisoprene, acrylobutadiene nitrile copolymer, or other epoxy-modified rubber-based polymers that have a plurality of epoxide groups.

The polyepoxide resin may be reacted with an extender to prepare a polyepoxide resin having a higher molecular weight having beta-hydroxy ester linkages. Suitable, nonlimiting examples of extenders include polycarboxylic acids, polyols, polyphenols, and amines having two or more amino hydrogens, especially dicarboxylic acids, diols, diphenols, and diamines. Particular, nonlimiting examples of suitable extenders include diphenols, diols, and diacids such as those mentioned above in connection with forming the polyepoxide; polycaprolactone diols, and ethoxylated bisphenol A resins such as those available from BASF Corporation under the trademark MACOL®. Other suitable extenders include, without limitation, carboxyl- or amine-functional acrylic, polyester, polyether, and epoxy resins and polymers. Still other suitable extenders include, without limitation, polyamines, including diamines such as ethylenediamine, diethylenetriamine, triethylenetetramine, dimethylaminopropylamine, dimethylaminobutylamine, diethylaminopropylamine, diethylaminobutylamine, dipropylamine, and piperizines such as 1-(2-aminoethyl)piperazine, polyalkylenepolyamines such as triethylenetetramine, tetraethylenepentamine, pentaethylenehexamine, tripropylenetetramine, tetrapropylenepentamine, pentapropylenehexamine, N,N'-bis(3-aminopropyl)ethylenediamine, N-(2-hydroxyethyl) propane-1,3-diamine, and polyoxyalkylene amines such as those available from BASF AG under the trademark POLYAMIN® or from Huntsman under the trademark JEFFAMINE®.

A monofunctional reactant may optionally be reacted with the polyepoxide resin and the extender or after reaction of the polyepoxide with the extender to prepare an epoxide-functional resin. Suitable, nonlimiting examples of monofunctional reactants include phenol, alkylphenols such as nonylphenol and dodecylphenol, other monofunctional, epoxide-reactive compounds such as dimethylethanolamine and monoepoxides such as the glycidyl ether of phenol, the glycidyl ether of nonylphenol, or the glycidyl ether of cresol, and dimer fatty acid.

Useful catalysts for the reaction of the polyepoxide resin with the extender and optional monofunctional reactant include any that activate an oxirane ring, such as tertiary amines or quaternary ammonium salts (e.g., benzyldimethylamine, dimethylaminocyclohexane, triethylamine, N-methylimidazole, tetramethyl ammonium bromide, and tetrabutyl ammonium hydroxide.), tin and/or phosphorous complex salts (e.g., $(CH_3)_3$ SNI, $(CH_3)_4$PI, triphenylphosphine, ethyltriphenyl phosphonium iodide, tetrabutyl phosphonium iodide) and so on. It is known in the art that tertiary amine catalysts may be preferred with some reactants. The reaction may be carried out at a temperature of from about 100° C. to about 350° C. (in other embodiments 160° C. to 250° C.) in solvent or neat. Suitable solvents include, without limitation, inert organic solvent such as a ketone, including methyl isobutyl ketone and methyl amyl ketone, aromatic solvents such as toluene, xylene, Aromatic 100, and Aromatic 150, and esters, such as butyl acetate, n-propyl acetate, hexyl acetate.

The polyepoxide resin may be reacted with the phosphorous-containing acid or acid derivative before, during, or after reaction of the polyepoxide resin with the extender and optional monofunctional reactant. The reaction with the acid or acid derivative, if carried out before or after the reaction with the extender, may be carried out at a temperature of from about 50° C. to about 150° C. in solvent, including any of those already mentioned, or neat. The polyepoxide resin may also be reacted with the phosphorous-containing acid or acid derivative and optionally a monofunctional reactant such as those already described and not be reacted with an extender.

The phosphorylated resin may be an amine-functional phosphorylated resin. The amine-functional phosphorylated resin has at least one amine group, and this amine functionality may introduced before or after the phosphorylating reaction. If before, the amine functionality may be introduced by reaction of the polyepoxide resin with an extender having a tertiary amine group or with a monofunctional reactant having a tertiary amine group. Suitable, nonlimiting examples of extenders and monofunctional reactants having an amine group include diethanolamine, dipropanolamine, diisopropanolamine, dibutanolamine, diisobutanolamine, diglycolamine, methylethanolamine, dimethylaminopropylamine, and compounds having a primary amine group that has been protected by forming a ketimine, such as the ketimine of diethylenetriamine.

The polyepoxide resin, extended polyepoxide resin, or epoxide-functional resin is then reacted with the phosphorous-containing acid or acid derivative such as one of those mentioned above to make a phosphorylated resin.

The phosphorylated resin may include monophosphonic acid esters, diphosphonic acid esters, monophosphate ester, diphosphate esters, and triphosphate esters, as well as combinations of these. In addition, the phosphorylated resin may have one or a plurality of the phosphorous-containing ester groups. The extent of esterification of phosphorous-containing acid or acid derivative and the number of phosphorous-containing ester groups incorporated into the resin is controlled, inter alia, by the relative equivalents of the reactants. In one example, from about 1 to about 3 equivalents of resin (based on epoxide and hydroxyl groups) is-reacted with each equivalent of phosphoric acid or phosphoric acid derivative. In another example, from about 1 to about 2 equivalents of resin (based on epoxide and hydroxyl groups) is reacted with each equivalent of phosphonic acid or phosphonic acid derivative. The equivalents of the resin reactive groups may also be in excess of the equivalents of acid or acid derivative. The resin and phosphoric or phosphonic acid or acid derivative may be mixed together and allowed to react until a desired extent of reaction is obtained. In certain embodiments, the weight per epoxide after reaction of an epoxide-functional resin is from about 180 to about 1200.

Other reactants that may be used in addition to the resin and phosphorous-containing acid or acid derivative may include alcohols such as n-butanol, isopropanol, and n-propanol; glycol ethers such as ethylene glycol monobutyl ether, propylene glycol monobutyl ether, and propylene glycol monopropyl ether; amines such as any of those mentioned above; water; and combinations of these. These reactants can also be used to react with excess oxirane groups after the reaction of the resin with the acid or acid derivative.

Amine or carboxyl functionality may be imparted to the phosphorylated epoxy resin in one of two ways. In a first way, an amine or carboxylic acid having at least one active hydrogen (e.g., an amino hydrogen or a second carboxyl group) reactive with an epoxide group is included as a reactant in the reaction of the epoxide-functional resin and phosphoric acid or source of phosphoric acid. In a second way, the reaction product of the epoxide-functional epoxy resin and phosphoric acid (and any further reactants) is an epoxide-functional product that is then further reacted with an amine or carboxylic acid having at least one active hydrogen reactive with an epoxide group. Examples of suitable amine compounds include, without limitation, dimethylaminopropylamine, N,N-diethylaminopropylamine, dimethylaminoethylamine, N-aminoethylpiperazine, aminopropylmorpholine, tetramethyldipropylenetriamine, methylamine, ethylamine, dimethylamine, dibutylamine, ethylenediamine, diethylenetriamine, triethylenetetramine, dimethylaminobutylamine, diethylaminopropylamine, diethylaminobutylamine, dipropylamine, methylbutylamine, alkanolamines such as methylethanolamine, aminoethylethanolamine, aminopropylmonomethylethanolamine, and diethanolamine, diketimine (a reaction product of 1 mole diethylenetriamine and 2 moles methyl isobutyl ketone), and polyoxyalkylene amines. Examples of suitable carboxylic acid include, without limitation, oxalic acid, maleic acid, malonic acid, succinic acid, and adipic acid.

In certain embodiments, the phosphorylated resin is an epoxide-functional resin that is reacted with an extender, such any of those already mentioned.

In some embodiments, the resin is a polyester resin. Polyfunctional acid or anhydride compounds can be reacted with polyfunctional alcohols to form the polyester, and include alkyl, alkylene, aralkylene, and aromatic compounds. Typical compounds include dicarboxylic acids and anhydrides; however, acids or anhydrides with higher functionality may also be used. If tri-functional compounds or compounds of higher functionality are used, these may be used in mixture with mono-functional carboxylic acids or anhydrides of monocarboxylic acids, such as versatic acid, fatty acids, or neodecanoic acid.

Illustrative examples of acid or anhydride functional compounds suitable for forming the polyester groups or anhydrides of such compounds include phthalic acid, phthalic anhydride, isophthalic acid, terephthalic acid, hexahydrophthalic acid, tetrachlorophthalic anhydride, hexahydrophthalic anhydride, pyromellitic anhydride, succinic acid, azeleic acid, adipic acid, 1,4-cyclohexanedicarboxylic acid, citric acid, and trimellitic anhydride.

The polyol component used to make the polyester resin has a hydroxyl functionality of at least 2. The polyol component may contain mono-, di-, and tri-functional alcohols, as well as alcohols of higher functionality. Diols are a typical polyol component. Alcohols with higher functionality may be used where some branching of the polyester is desired, and mixtures of diols and triols can be used as the polyol component. However, in some cases, highly branched polyesters are not desirable due to effects on the coating, such as decreased flow, and undesirable effects on the cured film, such as diminished chip resistance and smoothness.

Examples of useful polyols include, but are not limited to, ethylene glycol, diethylene glycol, triethylene glycol, propylene glycol, dipropylene glycol, butylene glycol, glycerine, trimethylolpropane, trimethylolethane, pentaerythritol, neopentyl glycol, 2,2,4-trimethyl-1,3-pentanediol, 1,6-hexanediol, 1,4-cyclohexane dimethanol, hydrogenated bisphenol A, and ethoxylated bisphenols.

Methods of making polyester resins are well-known. Polyesters are typically formed by heating together the polyol and poly-functional acid components, with or without catalysis, while removing the by-product of water in order to drive the reaction to completion. A small amount of a solvent, such as toluene, may be added in order to remove the water azeotropically. If added, such solvent is typically removed from the polyester product before the coating formulation is begun. The polyester resin may be phosphorylated by reaction of a hydroxyl group with the —P(OR)$_2$=O group-containing acid or acid derivative.

In some embodiments, the phosphorylated resin can be a polyurethane resin. Polyurethanes can be formed from two components, where the first includes compounds containing isocyanate-reactive groups, preferably hydroxyl groups, which are at least difunctional for the purposes of the isocyanate-addition reaction. The second component includes at least one polyisocyanate compound.

The polyol component must be at least difunctional for the purpose of the polymerization reaction. These compounds generally have an average functionality of about two to eight, preferably about two to four. These compounds generally have a molecular weight of from about 60 to about 10,000, preferably from 400 to about 8,000. However, it is also possible to use low molecular weight compounds having molecular weights below 400. The only requirement is that the compounds used should not be volatile under the heating conditions, if any, used to cure the compositions.

Preferred macromonomer compounds containing isocyanate-reactive hydrogen atoms are the known polyester polyols, polyether polyols, polyhydroxy polyacrylates and polycarbonates containing hydroxyl groups. In addition to these polyhydroxl compounds, it is also possible to use polyhydroxy polyacetals, polyhydroxy polyester amides, polythioethers containing terminal hydroxyl groups or sulfhydryl groups or at least difunctional compounds containing amino groups, thiol groups or carboxyl groups. Mixtures of the compounds containing isocyanate-reactive hydrogen atoms may also be used. Other exemplary hydroxyl containing compounds can be found in U.S. Pat. No. 4,439,593 issued on Mar. 27, 1984, which is hereby incorporated by reference.

Cationic polyurethanes and polyesters may also be used. Such materials may be prepared by endcapping with, for example, an aminoalcohol or, in the case of the polyurethane, the same compound comprising a saltable amine group previously described may also be useful. Such resins may be phosphorylated by reaction of one of the phosphorous-containing acids with a hydroxyl group on the resin. Both polyurethane and polyester polymers may be made hydroxyl-functional by reaction of a stoichiometric excess of polyol monomer with the polyisocyanate or polyacid, respectively, monomers.

The polyurethane resin may be phosphorylated by reaction of a hydroxyl group with the —P(OR)$_2$=O group-containing acid or acid derivative.

Polybutadiene, polyisoprene, or other epoxy-modified rubber-based polymers can be used as the principal resin in the present invention. The epoxy-rubber can be capped with a compound comprising a saltable amine group. One or more pedant epoxide or hydroxyl groups may be reacted with one of the phosphorous-containing acids to prepare a phosphorylated resin.

A phosphorylated vinyl or acrylic polymer may be prepared by esterifying a vinyl or acrylic polymer having epoxide or hydroxyl functionality or both with a phosphorous-containing acid or esterifiable derivative, or may be prepared by addition polymerizing a ethylenically unsaturated monomer that has the phosphorous-containing group or has been esterified with the phosphorous-containing acid or acid derivative. Reaction of the phosphorous-containing acid or esterifiable derivative with a hydroxyl group produces an ester linkage, while reaction with an epoxide group produces and ester linkage with a hydroxyl group on a beta carbon. The reaction is carried out as described above regarding esterifying an epoxy resin or reactant for preparing an epoxy resin. The phosphorous-containing acid or acid derivative may be reacted with a polymerizable monomer before polymerization of the acrylic polymer or with the acrylic polymer during or after polymerization. The reaction with the acid or acid derivative with polymer or monomer may be carried out at a temperature of from about 50° C. to about 150° C. in solvent such as any of those already mentioned, or neat. If carried out before polymerization (that is, with an addition polymerizable, ethylenically unsaturated monomer), it is advisable to use a small amount of polymerization inhibitor (e.g., hydroquinone or methylhydroquinone) to preserve the addition polymerizable unsaturated group. Suitable solvents include, without limitation, inert organic solvent such as a ketone, including methyl isobutyl ketone and methyl amyl ketone, aromatic solvents such as toluene, xylene, Aromatic 100, and Aromatic 150, and esters, such as butyl acetate, n-propyl acetate, hexyl acetate.

Nonlimiting, suitable examples of addition polymerizable monomers that may be reacted with the phosphorous-containing acid or derivative or that can be copolymerized to provide a hydroxyl or epoxide group on the acrylic polymer for reaction with the phosphorous-containing acid or derivative include, without limitation, hydroxyethyl acrylate, hydroxyethyl methacrylate, hydroxypropyl acrylate, hydroxypropyl methacrylate, hydroxybutyl acrylate, hydroxybutyl methacrylate, allyl alcohol, glycidyl acrylate, glycidyl methacrylate, and allyl glycidyl ether; these may be used in combinations. If hydroxyl or epoxide groups are also to be used as crosslinkable functionality during cure of the coating, the amount of hydroxyl or epoxide groups incorporated is increased over what is needed for reaction with the phosphorous-containing acid or esterifiable derivative to provide the desired residual amount of the hydroxyl or epoxide groups for crosslinking during cure.

The addition polymerizable monomer bearing the hydroxyl, epoxide, or phosphorous-containing group may be copolymerized with other addition polymerizable monomers in forming the acrylic polymer. Nonlimiting examples of suitable comonomers include α,β-ethylenically unsaturated monocarboxylic acids containing 3 to 5 carbon atoms and ethylenically unsaturated dicarboxylic acid and anhydrides; esters, nitriles, or amides of α,β-ethylenically unsaturated monocarboxylic acids containing 3 to 5 carbon atoms and ethylenically unsaturated dicarboxylic acid and anhydrides; vinyl esters, vinyl ethers, vinyl ketones, vinyl amides, and vinyl compounds of aromatics and heterocycles. Representative examples include acrylic and methacrylic acids, amides, and aminoalkyl amides; acrylonitrile and methacrylonitriles; esters of acrylic and methacrylic acid, including those of saturated aliphatic and cycloaliphatic alcohols containing 1 to 20 carbon atoms such as methyl methacrylate, ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, t-butyl acrylate, t-butyl methacrylate, amyl acrylate, amyl methacrylate, isoamyl acrylate, isoamyl methacrylate, hexyl acrylate, hexyl methacrylate, 2-ethylhexyl acrylate, 2-ethylhexyl methacrylate, decyl acrylate, decyl methacrylate, isodecyl acrylate, isodecyl methacrylate, dodecyl acrylate, dodecyl methacrylate, cyclohexyl acrylate, cyclohexyl methacrylate, substituted cyclohexyl acrylates and methacrylates, 3,5,5-trimethylhexyl acrylate, 3,5,5-trimethylhexyl methacrylate; dimethylaminoethyl, tert-butyl amino, tetrahydrofurfuryl, and isobornyl acrylates and methacrylates; the corresponding esters of maleic, fumaric, crotonic, isocrotonic, vinylacetic, and itaconic acids, and the like, such as maleic acid dimethyl ester and maleic acid monohexyl ester; vinyl monomers such as vinyl acetate, vinyl propionate, vinyl ethyl ether, and vinyl ethyl ketone, styrene, α-methyl styrene, vinyl toluene, 2-vinyl pyrrolidone, t-butyl styrene, and the like. Other useful polymerizable co-monomers include, for example, alkoxyethyl acrylates and methacrylates, acryloxy acrylates and methacrylates, and compounds such as acrylonitrile, methacrylonitrile, acrolein, and methacrolein. Combinations of these are usually employed.

Acrylic polymers may be prepared by using conventional techniques, such as free radical polymerization, cationic polymerization, or anionic polymerization, in, for example, a batch, semi-batch, or continuous feed process. For instance, the polymerization may be carried out by heating the ethylenically unsaturated monomers in bulk or in solution in the presence of a free radical source, such as an organic peroxide or azo compound and, optionally, a chain transfer agent, in a batch or continuous feed reactor. Alternatively, the monomers and initiator(s) may be fed into the heated reactor at a controlled rate in a semi-batch process.

Typical free radical sources are organic peroxides such as dialkyl peroxides, peroxyesters, peroxydicarbonates, diacyl peroxides, hydroperoxides, and peroxyketals; and azo compounds such as 2,2'-azobis(2-methylbutanenitrile) and 1,1'-azobis(cycohexanecarbonitrile). Typical chain transfer agents are mercaptans such as octyl mercaptan, n- or tert-dodecyl mercaptan, thiosalicyclic acid, mercaptoacetic acid, and mercaptoethanol; halogenated compounds, and dimeric alpha-methyl styrene. The free radical polymerization is usually carried out at temperatures from about 20° C. to about 250° C., preferably from 90° C. to 170° C. The reaction is carried out according to conventional methods to produce a vinyl or acrylic copolymer.

The phosphorylated acrylic polymer may include monophosphonic acid esters, diphosphonic acid esters, monophosphate ester, diphosphate esters, and triphosphate esters of the acrylic polymer, as well as combinations of these. In addition, the phosphorylated acrylic polymer may have one or a plurality of the phosphorous-containing ester groups. The extent of esterification by the phosphorous-containing acid or acid derivative and the number of phosphorous-containing ester groups incorporated into the resin may be controlled, inter alia, by the relative equivalents of the reactants. In one example, from about 1 to about 3 equivalents of vinyl or acrylic polymer (based on epoxide and/or hydroxyl groups) is reacted with each equivalent of phosphoric acid or phosphoric acid derivative. In another example, from about 1 to about 2 equivalents of acrylic polymer (based on epoxide and hydroxyl groups) is reacted with each equivalent of phosphonic acid or phosphonic acid derivative. The equivalents of the polymer reactive groups may also be in excess of the equivalents of acid or acid derivative. The polymer and phosphoric or phosphonic acid or acid derivative may be mixed together and allowed to react until a desired extent of reaction is obtained. In some embodiments, the acrylic or vinyl polymer has from about 0.01 to about 1 milliequivalents phosphorous-containing groups per gram; in some embodiments, the acrylic or vinyl polymer has from about 0.01 to about 0.1 milliequivalents phosphorous-containing groups per gram.

Other reactants that may be used in the phosphorylation reaction in addition to the acrylic polymer and phosphorous-containing acid or acid derivative may include alkyl or aromatic alcohols such as n-butanol, isopropanol, and n-propanol; glycol ethers such as ethylene glycol monobutyl ether, propylene glycol monobutyl ether, and propylene glycol monopropyl ether; alkyl or aromatic amines such as dimethylethanolamine; diethanolamine, dipropanolamine, diisopropanolamine, dibutanolamine, diisobutanolamine, diglycolamine, methylethanolamine, dimethylaminopropylamine, water; and combinations of these. These reactants can also be used to react with excess oxirane or hydroxyl groups after the reaction of the acrylic polymer with the acid or acid derivative. Similarly, such other reactants may be included when a polymerizable monomer having an epoxide or hydroxyl group is reacted with the phosphorous-containing acid or acid derivative before polymerization of the acrylic polymer.

The electrodeposition coating composition includes at least one resin that is electrodepositable, i.e., at least one principal resin. If the phosphorylated resin does not have, for cathodic electrodeposition, amine functionality or, for anodic deposition, an acid group, a principal resin that does include amine or acid functionality can be combined with the phosphorylated epoxy resin in the electrocoat coating composition. A variety of such resins are known, including without limitation, acrylic, polyester, epoxy, and polybutadiene resins as mentioned. For cathodic electrodeposition coating, the resin has salted basic groups (e.g., primary, secondary, or tertiary amine groups) or quaternary groups (e.g., ammonium, sulfonium, or phosphonium groups); for anodic electrodeposition coating, the resin has base-salted acid groups. In one embodiment, the phosphorylated epoxy resin is at least about 0.01 weight percent of the binder, or from about 0.01 to about 99 weight percent of the binder, or from about 1 to about 90 weight percent of the binder, or from about 5 to about 80 weight percent of the binder. In other embodiments, the phosphorylated epoxy resin is from about 0.01 to about 30 weight percent of the binder, or from about 1 to about 30 weight percent of the binder, or from about 5 to about 20 weight percent of the binder, while an electrodepositable resin is from about 45 to about 75 weight percent of the binder or from about 50 to about 70 weight percent of the binder.

A variety of electrodepositable resins are known, including without limitation, acrylic, polyester, epoxy, and polybutadiene resins The resin has salted basic groups (e.g., primary, secondary, or tertiary amine groups) or quaternary groups (e.g., ammonium, sulfonium, or phosphonium groups) for cathodic deposition or salted carboxyl groups for anodic deposition. Examples of suitable resins include epoxy resins, polyesters, polyurethanes, vinyl resins such as polyacrylate resins, and polybutadiene resins. In one embodiment, the resin is an epoxy resin functionalized with amine groups. The epoxy resin may be prepared from a polyglycidyl ether. For example, the polyglycidyl ether may be the polyglycidyl ether of bisphenol A or similar polyphenols. It may also be advantageous to extend the epoxy resin by reacting an excess of epoxide group equivalents with a modifying material, such as a polyol, a polyamine or a polycarboxylic acid, in order to improve the film properties. Preferably, the polyglycidyl ether is extended with bisphenol A. Useful epoxy resins of this kind have a weight average molecular weight, which can be determined by GPC, of from about 3000 to about 6000. Epoxy equivalent weights can range from about 200 to about 2500, and are preferably from about 500 to about 1500.

Amine groups can be incorporated as before by reacting the polyglycidyl ethers of the polyphenols with amine or polyamines. Typical amines and polyamines include, without limitation, dibutylamine, ethylenediamine, diethylenetriamine, triethylenetetramine, dimethylaminopropylamine, dimethylaminobutylamine, diethylaminopropylamine, diethylaminobutylamine, dipropylamine, and similar compounds, and combinations thereof. In a preferred embodiment, the epoxide groups on the epoxy resin are reacted with a compound comprising a secondary amine group and at least one latent primary amine. The latent primary amine group is preferably a ketimine group. The primary amines are regenerated when the resin is emulsified.

Quaternary ammonium groups may be incorporated, and are formed, for example, from a tertiary amine by salting it with an acid, then reacting the salting hydrogen with, e.g., a compound bearing an epoxide group to produce an ammonium group. Resins used according to the invention preferably have a primary amine equivalent weight of about 300 to about 3000, and more preferably of about 850 to about 1300.

Epoxy-modified novolacs can be used as the resin in the electrocoat coating composition. The epoxy-novolac resin can be capped in the same way as previously described for the epoxy resin.

Cationic polyurethanes and polyesters may also be used. Such materials may be prepared by endcapping with, for example, an aminoalcohol or, in the case of the polyurethane, the same compound comprising a saltable amine group previously described may also be useful.

Polybutadiene, polyisoprene, or other epoxy-modified rubber-based polymers can be used as the resin in the present invention. The epoxy-rubber can be capped with a compound comprising a saltable amine group.

In an alternative embodiment, cationic acrylic resins may be used. Acrylic polymers may be made cathodic by incorporation of amino-containing monomers, such as acrylamide, methacrylamide, N,N'-dimethylaminoethyl methacrylate tert-butylaminoethyl methacrylate. 2-vinylpyridine, 4-vinylpyridine, vinylpyrrolidine or other such amino monomers. Alternatively, epoxy groups may be incorporated by including an epoxy-functional monomer in the polymerization reaction. Such epoxy-functional acrylic polymers may be made cathodic by reaction of the epoxy groups with amines according to the methods previously described for the epoxy resins.

The amine equivalent weight of the cationic resin or acid equivalent weight of an anodic resin can range from about 150 to about 5000, and preferably from about 500 to about 2000. The hydroxyl equivalent weight of the resins is generally between about 150 and about 2000, and preferably about 200 to about 800.

The binder also includes a carboxylate group separated by 2 to 4 carbons from an ester group, such as monoester of a cyclic anhydride. The carboxylate/ester group may be a part of the phosphorylated resin, the principal resin, a crosslinker resin, or still another resin. The resin may be selected from epoxy, acrylic, polyurethane, polycarbonate, polysiloxane, polyvinyl, polyether, aminoplast, and polyester resins, and can include mixtures thereof. In some embodiments, the carboxylate/ester group is bonded to the resin a linkage such as ester, amine, urethane, and ether bonds, among others. Exemplary reactions of functional groups to produce these linkages include: epoxide reacted with acid resulting in an ester linkage; epoxide reacted with amine resulting in an amine linkage; hydroxyl reacted with isocyanate resulting in a urethane linkage; hydroxyl reacted with anhydride resulting in an ester linkage; epoxide reacted with hydroxyl resulting in an ether linkage. In one particular embodiment, the carboxylate/ester group is produced by reacting the resin with a cyclic anhydride. In various embodiments, the carboxylate/ester group may have a structure

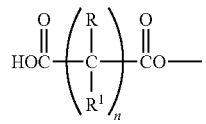

in which n is 2, 3, or 4 and each of R and $R^1$ is independently selected from H and alkyl groups having one to four carbon atoms. In certain embodiments each of R and $R^1$ is independently selected from H and hydrocarbyl groups having one to four carbon atoms.

In some embodiments, the resin with the carboxyl/ester group is an epoxy resin, acrylic polymer, polyurethane polymer or polyester polymer prepared as described above. A cyclic anhydride may be reacted with a group on the resin such as an epoxide group, hydroxyl group, thiol group, or primary or secondary amine group.

In some embodiments, the resin is an epoxy resin or acrylic polymer. These may be prepared according to the methods already described.

In some embodiments, the resin is a polyester resin. Polyfunctional acid or anhydride compounds can be reacted with polyfunctional alcohols to form the polyester, and include alkyl, alkylene, aralkylene, and aromatic compounds. Typical compounds include dicarboxylic acids and anhydrides; however, acids or anhydrides with higher functionality may also be used. If tri-functional compounds or compounds of higher functionality are used, these may be used in mixture with mono-functional carboxylic acids or anhydrides of monocarboxylic acids, such as versatic acid, fatty acids, or neodecanoic acid.

Illustrative examples of acid or anhydride functional compounds suitable for forming the polyester groups or anhydrides of such compounds include phthalic acid, phthalic anhydride, isophthalic acid, terephthalic acid, hexahydrophthalic acid, tetrachlorophthalic anhydride, hexahydrophthalic anhydride, pyromellitic anhydride, succinic acid, azeleic acid, adipic acid, 1,4-cyclohexanedicarboxylic acid, citric acid, and trimellitic anhydride.

The polyol component used to make the polyester resin has a hydroxyl functionality of at least 2. The polyol component may contain mono-, di-, and tri-functional alcohols, as well as alcohols of higher functionality. Diols are a typical polyol component. Alcohols with higher functionality may be used where some branching of the polyester is desired, and mixtures of diols and triols can be used as the polyol component. However, in some cases, highly branched polyesters are not desirable due to effects on the coating, such as decreased flow, and undesirable effects on the cured film, such as diminished chip resistance and smoothness.

Examples of useful polyols include, but are not limited to, ethylene glycol, diethylene glycol, triethylene glycol, propylene glycol, dipropylene glycol, butylene glycol, glycerine, trimethylolpropane, trimethylolethane, pentaerythritol, neopentyl glycol, 2,2,4-trimethyl-1,3-pentanediol, 1,6-hexanediol, 1,4-cyclohexane dimethanol, hydrogenated bisphenol A, and ethoxylated bisphenols.

Methods of making polyester resins are well-known. Polyesters are typically formed by heating together the polyol and poly-functional acid components, with or without catalysis, while removing the by-product of water in order to drive the reaction to completion. A small amount of a solvent, such as toluene, may be added in order to remove the water azeotropically. If added, such solvent is typically removed from the polyester product before the coating formulation is begun.

In some embodiments, the resin can be a polyurethane resin. Polyurethanes can be formed from two components, where the first includes compounds containing isocyanate-reactive groups, preferably hydroxyl groups, which are at least difunctional for the purposes of the isocyanate-addition reaction. The second component includes at least one polyisocyanate compound.

The polyol component must be at least difunctional for the purpose of the polymerization reaction. These compounds generally have an average functionality of about two to eight, preferably about two to four. These compounds generally have a molecular weight of from about 60 to about 10,000, preferably from 400 to about 8,000. However, it is also possible to use low molecular weight compounds having molecular weights below 400. The only requirement is that the compounds used should not be volatile under the heating conditions, if any, used to cure the compositions.

Preferred macromonomer compounds containing isocyanate-reactive hydrogen atoms are the known polyester polyols, polyether polyols, polyhydroxy polyacrylates and polycarbonates containing hydroxyl groups. In addition to these polyhydroxl compounds, it is also possible to use polyhydroxy polyacetals, polyhydroxy polyester amides, polythioethers containing terminal hydroxyl groups or sulfhydryl groups or at least difunctional compounds containing amino groups, thiol groups or carboxyl groups. Mixtures of the compounds containing isocyanate-reactive hydrogen atoms may also be used. Other exemplary hydroxyl containing compounds can be found in U.S. Pat. No. 4,439,593 issued on Mar. 27, 1984, which is hereby incorporated by reference.

A crosslinker such as a polyisocyanate can be provided with a hydroxyl group by reaction with an aminoalcohol or, less cleanly, by reaction with a polyol such as a diol. A polyepoxide crosslinker may be reacted through one of its epoxide groups to make the carboxylate/ester group.

In certain embodiments, the resin having the carboxylate/ester group has a number average molecular weight of at least about 800, and particularly at least about 2000 daltons.

In a first embodiment, the resin having the carboxylate/ester group is prepared by reaction of a resin having a hydroxyl group with a cyclic anhydride. The anhydride, also commonly referred to as a carboxylic acid anhydride, may be either an aromatic or non-aromatic cyclic anhydride. In one embodiment, the carboxylate/ester group can be represented by a structure —OC(=O)—CR—CR'—COOH, in which R and R' are each independently an alkyl group, an alkenyl group, or a hydrogen atom or together are part of cyclic structure which may be aliphatic or aromatic. Nonlimiting examples of suitable cyclic anhydrides include dodecenylsuccinic anhydride, maleic anhydride, hexahydrophthalic anhydride, methyl-hexahydrophthalic anhydride, tetrahydrophthalic anhydride, phthalic anhydride, succinic anhydride, trimellitic anhydride, and combinations of these.

In another embodiment, the resin with carboxyl/ester group is formed from the crosslinker by reacting a hydroxy-functional carboxylic acid with the crosslinker. The hydroxy-functional carboxylic acid has one or two hydroxy groups. Examples of such hydroxy-functional carboxylic acids include, but are not limited to, lactic acid, 12-hydroxystearic acid, 2,2'-bis(hydroxymethyl)propionic acid, also referred to as dimethylolpropionic acid (DMPA), 2,2-bis(hydroxymethyl) butylic acid, and dimethylbis(hydroxymethyl) malonate. The hydroxyl-functional carboxylic acid is reacted with an isocyanate group of the crosslinker. Nonlimiting examples of isocyanate-functional materials suitable as the crosslinker include 4,4'-methylene bisdiphenyldiisocyanate (MDI), commercially available from BASF Corporation under the tradenames Lupranate® M and Lupranate® M20S. The crosslinker may first be reacted with an alcohol blocking group, e.g., by reaction with diethyleneglycolbutylether alcohol, to leave about one isocyanate group available for reaction with the hydroxyl-containing carboxylic acid so that one mole of the hydroxy-functional carboxylic acid is reacted for every one mole of the crosslinker.

The resin with the carboxyl/ester group can have more than one carboxyl/ester group. In particular embodiments, the resin may have from about 1000 to about 16,000 meq/g carboxyl/ester groups.

The phosphorylated resin and carboxyl/ester group resin (if a different resin) are used to prepare an electrocoat coating composition (also known as an electrocoat bath). In general, a binder is prepared comprising the carboxyl/ester group and phosphorylated resin, then the binder is dispersed in an aqueous medium by salting ionizable groups present in the binder.

The binder may also comprise a crosslinker that reacts with the resin during curing of a coating layer formed on a substrate. Suitable examples of crosslinking agents, include, without limitation, blocked polyisocyanates. Examples of aromatic, aliphatic or cycloaliphatic polyisocyanates include diphenylmethane-4,4'-diisocyanate (MDI), 2,4- or 2,6-toluene diisocyanate (TDI), p-phenylene diisocyanate, tetramethylene diisocyanate, hexamethylene diisocyanate, dicyclohexylmethane-4,4'-diisocyanate, isophorone diisocyanate, mixtures of phenylmethane-4,4'-diisocyanate, polymethylene polyphenylisocyanate, 2-isocyanatopropylcyclohexyl isocyanate, dicyclohexylmethane 2,4'-diisocyanate, 1,3-bis(iso-cyanatomethyl)cyclohexane, diisocyanates derived from dimer fatty acids, as sold under the commercial designation DDI 1410 by Henkel, 1,8-diisocyanato-4-isocyanatomethyloctane, 1,7-diisocyanato-4-isocyanato-methylheptane or 1-isocyanato-2-(3-isocyanatopropyl)-cyclohexane, and higher polyisocyanates such as triphenylmethane-4,4',4"-triisocyanate, or mixtures of these polyisocyanates. Suitable polyisocyanates also include polyisocyanates derived from these that containing isocyanurate, biuret, allophanate, iminooxadiazinedione, urethane, urea, or uretdione groups. Polyisocyanates containing urethane groups, for example, are obtained by reacting some of the isocyanate groups with polyols, such as trimethylolpropane, neopentyl glycol, and glycerol, for example. The isocyanate groups are reacted with a blocking agent. Examples of suitable blocking agents include phenol, cresol, xylenol, epsilon-caprolactam, delta-valerolactam, gamma-butyrolactam, diethyl malonate, dimethyl malonate, ethyl acetoacetate, methyl acetoacetate, alcohols such as methanol, ethanol, isopropanol; propanol, isobutanol tert-butanol, butanol, glycol monoethers such as ethylene or propylene glycol monoethers, acid amides (e.g. acetoanilide), imides (e.g. succinimide), amines (e.g. diphenylamine), imidazole, urea, ethylene urea, 2-oxazolidone, ethylene imine, oximes (e.g. methylethyl ketoxime), and the like.

The binder may include one or more additional resins. Nonlimiting examples of suitable additional resins include epoxy resins, polyesters, polyurethanes, vinyl resins such as polyacrylate resins, and polybutadiene resins. The additional resin may be, for example, any of the polyepoxide resins, extended polyepoxide resins, or epoxide-functional resins already mentioned, optionally reacted with a compound having at least one epoxide-reactive group.

Embodiments of the present disclosure include crosslinker (i.e., curing agent) compounds having the carboxylate/ester group. For example, in some embodiments a crosslinker for a film-forming material comprises an alkyl or aromatic compound comprising at least two functional groups reactive with a film-forming resin and at least one pendent group comprising a nonionic metal coordinating structure. Functional groups reactive with a film-forming resin include isocyanate, blocked isocyanate, uretdione, epoxide, hydroxyl, carboxyl, carbamate, aldehyde, amide, and amine groups. Crosslinkers having nonionic metal coordinating structures can coordinate metals or metal compounds, such as metal catalysts. Furthermore, these crosslinkers can be mixed with the film-forming materials of the present disclosure and/or with other resins to form coating compositions which can be used to coat substrates. For example, a method of producing a coated substrate comprises preparing a coating composition comprising a crosslinker and a film-forming material, wherein one of the crosslinker and the film-forming material comprises a nonionic metal coordinating structure; and applying the coating composition to the substrate.

The binder may also comprise a crosslinker that reacts with the phosphorylated resin, the second, amine-functional resin (if present), or both during curing of a coating layer formed on a substrate, or the binder may also comprise a crosslinker that reacts with both the amine-functional resin other than the phosphorylated resin and the phosphorylated resin during curing of a coating layer formed on a substrate. Optionally, plasticizer or solvents or both can be added to the binder mixture. Nonlimiting examples of coalescing solvents include alcohols, glycol ethers, polyols, and ketones. Specific coalescing solvents include monobutyl and monohexyl ethers of ethylene glycol, phenyl ether of propylene glycol, monoalkyl ethers of ethylene glycol such as the monomethyl, monoethyl, monopropyl, and monobutyl ethers of ethylene glycol or propylene glycol; dialkyl ethers of ethylene glycol or propylene glycol such as ethylene glycol dimethyl ether and propylene glycol dimethyl ether; butyl carbitol; diacetone alcohol. Nonlimiting examples of plasticizers include ethylene or propylene oxide adducts of nonyl phenols, bisphenol A, cresol, or other such materials, or polyglycols based on ethylene oxide and/or propylene oxide. The amount of coalescing solvent is not critical and is generally between about 0 to 15 percent by weight, preferably about 0.5 to 5 percent by weight based on total weight of the resin solids. Plasticizers can be used at levels of up to 15 percent by weight resin solids.

The present disclosure also includes various embodiments where crosslinkers or curing agents the carboxylate/ester group, where the nonionic metal coordinating structures include the various embodiments described elsewhere herein. In some embodiments; a method of producing a coating composition comprises forming a film-forming material by the various reaction mixtures described herein and combining a crosslinker having a nonionic metal coordinating structure and the film-forming material. For example, upon curing these coating compositions, the resulting cured film can include nonionic metal coordinating structures incorporated from the film-forming material and/or nonionic metal coordinating structures incorporated from the crosslinkers. The nonionic metal coordinating groups may be used to provide improved adhesion to metal of the coating formed from the composition. In some embodiments, the crosslinkers comprising nonionic metal coordinating structures can be complexed with one or more metal catalysts prior to forming the coating composition or the metal catalyst can be added after the crosslinker is combined with the film-forming material.

Nonlimiting examples of suitable acids include phosphoric acid, phosphonic acid, propionic acid, formic acid, acetic acid, lactic acid, or citric acid. The salting acid may be blended with the binder, mixed with the water, or both, before the binder is added to the water. The acid is used in an amount sufficient to neutralize enough of the amine groups to impart water-dispersibility to the binder. The amine groups may be fully neutralized; however, partial neutralization is usually sufficient to impart the required water-dispersibility. By saying that the resin is at least partially neutralized, we mean that at least one of the saltable groups of the binder is neutralized, and up to all of such groups may be neutralized. The degree of neutralization that is required to afford the requisite water-dispersibility for a particular binder will depend upon its composition, molecular weight of the resins, weight percent of amine-functional resin, and other such factors and can readily be determined by one of ordinary skill in the art through straightforward experimentation.

The binder emulsion is then used in preparing an electrocoat coating composition (or bath). The electrocoat bath may contain no pigment so as to produce a colorless or clear electrodeposited coating layer, but the electrocoat bath usually includes one or more pigments, separately added as part of a pigment paste, and may contain any further desired materials such as coalescing aids, antifoaming aids, and other additives that may be added before or after emulsifying the resin. Conventional pigments for electrocoat primers include titanium dioxide, ferric oxide, carbon black, aluminum silicate, precipitated barium sulfate, aluminum phosphomolybdate, strontium chromate, basic lead silicate or lead chromate. The pigments may be dispersed using a grind resin or a pigment dispersant. The pigment-to-resin weight ratio in the electrocoat bath can be important and should be preferably less than 50:100, more preferably less than 40:100, and usually about 10 to 30:100. Higher pigment-to-resin solids weight ratios have been found to adversely affect coalescence and flow. Usually, the pigment is 10-40 percent by weight of the nonvolatile material in the bath. Preferably, the pigment is 15 to 30 percent by weight of the nonvolatile material in the bath. Any of the pigments and fillers generally used in electrocoat primers may be included. Inorganic extenders such as clay and anti-corrosion pigments are commonly included.

The electrodeposition coating compositions can contain optional ingredients such as dyes, flow control agents, plasticizers, catalysts, wetting agents, surfactants, UV absorbers, HALS compounds, antioxidants, defoamers and so forth. Examples of surfactants and wetting agents include alkyl imidazolines such as those available from Ciba-Geigy Industrial Chemicals as AMINE C® acetylenic alcohols such has those available from Air Products and Chemicals under the tradename SURFYNOL®. Surfactants and wetting agents, when present, typically amount to up to 2 percent by weight resin solids.

Curing catalysts such as tin catalysts can be used in the coating composition. Typical examples are without limitation, tin and bismuth compounds including dibutyltin dilaurate, dibutyltin oxide, and bismuth octoate. When used, catalysts are typically present in amounts of about 0.05 to 2 percent by weight tin based on weight of total resin solids.

The electrocoat coating composition is electrodeposited onto a metallic substrate. The substrate may be, as some nonlimiting examples, cold-rolled steel, galvanized (zinc coated) steel, electrogalvanized steel, stainless steel, pickled steel, GALVANNEAL® GALVALUME®, and GALVAN® zinc-aluminum alloys coated upon steel, and combinations of these. Nonlimiting examples of useful non-ferrous metals include aluminum, zinc, magnesium and alloys of these. The electrodeposition of the coating preparations according to the invention may be carried out by known processes. The electrodeposition coating composition may be applied preferably to a dry film thickness of 10 to 35 µm. In one embodiment of the method, the electrically conductive substrate is unphosphated; that is, it is free of a phosphate pre-treatment The article coated with the composition of the invention may be a metallic automotive part or body. A method of coating an electrically conductive substrate, such as a metal automotive vehicle body or part, comprises placing an electrically conductive substrate, cleaned but preferably not given a phosphate pre-treatment, into the electrocoat coating composition and, using the electrically conductive substrate as the cathode, passing a current through the electrocoat coating composition causing a coating layer to deposit onto the electrically conductive substrate. After application, the coated article is removed from the bath and rinsed with deionized water. The coating may be cured under appropriate conditions, for example by baking at from about 275° F. to about 375° F. for between about 15 and about 60 minutes, before applying an additional coating layer over the electrodeposited coating layer.

An automotive vehicle body may be electrocoated. The automotive vehicle body is cleaned, and the cleaned metal automotive vehicle body is electrocoated with an aqueous electrodeposition coating composition comprising the phosphorylated resin.

One or more additional coating layers, such as a spray-applied primer-surfacer, single topcoat layer, or composite color coat (basecoat) and clearcoat layer, may be applied over the electrocoat layer. A single layer topcoat is also referred to as a topcoat enamel. In the automotive industry, the topcoat is typically a basecoat that is overcoated with a clearcoat layer. A primer surfacer and the topcoat enamel or basecoat and clearcoat composite topcoat may be waterborne, solventborne, or a powder coating, which may be a dry powder or an aqueous powder slurry.

The composite coating of the invention may have, as one layer, a primer coating layer, which may also be termed a primer-surfacer or filler coating layer. The primer coating layer can be formed from a solventborne composition, waterborne composition, or powder composition, including powder slurry composition. The primer composition preferably has a binder that is thermosetting, although thermoplastic binders are also known. Suitable thermosetting binders may have self-crosslinking polymers or resins, or may include a crosslinker reactive with a polymer or resin in the binder. Nonlimiting examples of suitable binder polymers or resins include acrylics, polyesters, and polyurethanes. Such polymers or resins may include as functional groups hydroxyl groups, carboxyl groups, anhydride groups, epoxide groups, carbamate groups, amine groups, and so on. Among suitable crosslinkers reactive with such groups are aminoplast resins (which are reactive with hydroxyl, carboxyl, carbamate, and amine groups), polyisocyanates, including blocked polyisocyanates (which are reactive with hydroxyl groups and amine groups), polyepoxides (which are reactive with carboxyl, anhydride, hydroxyl, and amine groups), and polyacids and polyamines (which are reactive with epoxide groups). Examples of suitable primer compositions are disclosed, for example, in U.S. Pat. Nos. 7,338,989; 7,297,742; 6,916,877; 6,887,526; 6,727,316; 6,437,036; 6,413,642; 6,210,758; 6,099,899; 5,888,655; 5,866,259; 5,552,487; 5,536,785; 4,882,003; and 4,190,569, each assigned to BASF and each incorporated herein by reference.

The primer coating composition applied over the electrocoat primer may then be cured to form a primer coating layer. The electrocoat primer may be cured at the same time as the primer coating layer in a process known as "wet-on-wet" coating.

A topcoat composition may be applied over the electrocoat layer or primer coating layer and, preferably, cured to form a topcoat layer. In a preferred embodiment, the electrocoat layer or primer layer is coated with a topcoat applied as a color-plus-clear (basecoat-clearcoat) topcoat. In a basecoat-clearcoat topcoat, an underlayer of a pigmented coating, the basecoat, is covered with an outer layer of a transparent coating, the clearcoat. Basecoat-clearcoat topcoats provide an attractive smooth and glossy finish and generally improved performance.

Crosslinking compositions are preferred as the topcoat layer or layers. Coatings of this type are well-known in the art and include waterborne compositions, solventborne compositions, and powder and powder slurry compositions. Polymers known in the art to be useful in basecoat and clearcoat compositions include, without limitation, acrylics, vinyls, polyurethanes, polycarbonates, polyesters, alkyds, and polysiloxanes. Acrylics and polyurethanes are among preferred polymers for topcoat binders. Thermoset basecoat and clearcoat compositions are also preferred, and, to that end, preferred polymers comprise one or more kinds of crosslinkable functional groups, such as carbamate, hydroxy, isocyanate, amine, epoxy, acrylate, vinyl, silane, acetoacetate, and so on. The polymer may be self-crosslinking, or, preferably, the composition may include a crosslinking agent such as a polyisocyanate or an aminoplast resin. Examples of suitable topcoat compositions are disclosed, for example, in U.S. Pat. Nos. 7,375,174; 7,342,071; 7,297,749; 7,261,926; 7,226,971; 7,160,973; 7,151,133; 7,060,357; 7,045,588; 7,041,729; 6,995,208; 6,927,271; 6,914,096; 6,900,270; 6,818,303; 6,812,300; 6,780,909; 6,737,468; 6,652,919; 6,583,212; 6,462,144; 6,337,139; 6,165,618; 6,129,989; 6,001,424; 5,981,080; 5,855,964; 5,629,374; 5,601,879; 5,508,349; 5,502,101; 5,494,970; 5,281,443; and, each assigned to BASF and each incorporated herein by reference.

The further coating layers can be applied to the electrocoat coating layer according to any of a number of techniques well-known in the art. These include, for example, spray coating, dip coating, roll coating, curtain coating, and the like. For automotive applications, the further coating layer or layers are preferably applied by spray coating, particularly electrostatic spray methods. Coating layers of one mil or more are usually applied in two or more coats, separated by a time sufficient to allow some of the solvent or aqueous medium to evaporate, or "flash," from the applied layer. The flash may be at ambient or elevated temperatures, for example, the flash may use radiant heat. The coats as applied can be from 0.5 mil up to 3 mils dry, and a sufficient number of coats are applied to yield the desired final coating thickness.

A primer layer may be cured before the topcoat is applied. The cured primer layer may be from about 0.5 mil to about 2 mils thick, preferably from about 0.8 mils to about 1.2 mils thick.

Color-plus-clear topcoats are usually applied wet-on-wet. The compositions are applied in coats separated by a flash, as described above, with a flash also between the last coat of the color composition and the first coat the clear. The two coating layers are then cured simultaneously. Preferably, the cured basecoat layer is 0.5 to 1.5 mils thick, and the cured clear coat layer is 1 to 3 mils, more preferably 1.6 to 2.2 mils, thick.

Alternatively the primer layer and the topcoat can be applied "wet-on-wet." For example, the primer composition can be applied, then the applied layer flashed; then the topcoat can be applied and flashed; then the primer and the topcoat can be cured at the same time. Again, the topcoat can include a basecoat layer and a clearcoat layer applied wet-on-wet. The primer layer can also be applied to an uncured electrocoat coating layer, and all layers cured together.

The coating compositions described are preferably cured with heat. Curing temperatures are preferably from about 70° C. to about 180° C., and particularly preferably from about 170° F. to about 200° F. for a topcoat or primer composition including an unblocked acid catalyst, or from about 240° F. to about 275° F. for a topcoat or primer composition including a blocked acid catalyst. Typical curing times at these temperatures range from 15 to 60 minutes, and preferably the temperature is chosen to allow a cure time of from about 15 to about 30 minutes. In a preferred embodiment, the coated article is an automotive body or part.

The invention is further described in the following example. The example is merely illustrative and does not in any way limit the scope of the invention as described and claimed. All parts are parts by weight unless otherwise noted.

EXAMPLES

Preparation A: Preparation of the Phosphorylated Epoxy Resin

A reactor equipped with an agitator and reflux condenser is charged with 25.85 parts by weight of normal butanol, 10.20 parts by weight of ethylene glycol monobutyl ether, and 55.62 parts by weight of the diglycidyl ether of Bisphenol A. The reactor contents are stirred for about 15 minutes followed by addition of 4.261 parts by weight of phosphoric acid (75% aqueous) and 1.77 parts by weight normal butanol. The resulting mixture is stirred at room temperature for an additional 15 minutes then heated to 102.2° F. (49° C.). The heat is turned off and the mixture is allowed to exotherm, recorded as 260.6° F. (127° C.). The reaction mixture is cooled to 220-250° F. (104.4-121.1° C.) and held for 2 hours, at which time the weight per epoxide of the product is 20,000 or greater. Deionized water is added in a first portion of 0.899 parts by weight, and the reaction mixture is maintained at 220-250° F. (104.4-121.1° C.) for one hour. A second portion of deionized water, 0.70 parts by weight, is then added to the reaction mixture. Again tie reaction mixture is maintained at 220-250° F.

(104.4-121.1° C.) for one hour. A final portion of deionized water, 0.70 parts by weight, is then added to the reaction mixture. Again the reaction mixture is maintained at 220-250° F. (104.4-121.1° C.) for one hour. The resulting mixture has an acid number of 29-32 mg KOH/g. The mixture is then diluted with normal butanol to 72% nonvolatile by weight.

Preparation B: Preparation of the Phosphorylated Epoxy Resin Carboxylated with Dodecenylsuccinic Anhydride (DDSA)

A reactor equipped with an agitator and reflux condenser is charged with 25.85 parts by weight of normal butanol, 10.20 parts by weight of ethylene glycol monobutyl ether, and 55.62 parts by weight of the diglycidyl ether of Bisphenol A. The reactor contents are stirred for about 15 minutes followed by addition of 4.261 parts by weight of phosphoric acid (75% aqueous) and 1.77 parts by weight normal butanol. The resulting mixture is stirred at room temperature for an additional 15 minutes then heated to 102.2° F. (49° C.). The heat is turned off and the mixture is allowed to exotherm, recorded as 260.6° F. (127° C.). The reaction mixture is cooled to 220-250° F. (104.4-121.1° C.) and held for 2 hours, at which time the weight per epoxide of the product is 20,000 or greater. Deionized water is added in a first portion of 0.899 parts by weight, and the reaction mixture is maintained at 220-250° F. (104.4-121.1° C.) for one hour. A second portion of deionized water, 0.70 parts by weight, is then added to the reaction mixture. Again the reaction mixture is maintained at 220-250° F. (104.4-121.1° C.) for one hour. A final portion of deionized water, 0.70 parts by weight, is then added to the reaction mixture. Again the reaction mixture is maintained at 220-250° F. (104.4-121.1° C.) for one hour. At this stage, the product has an acid number of 29-32 mg KOH/g. A portion of 1.63 parts by weight of dodecenylsuccinic anhydride (DDSA) is introduced at 220° F. (104.4° C.) and the mixture is subsequently heated to 266° F. (130° C). The mixture is allowed to stir for 2.5 hours. The resulting mixture has a 35-36 acid number. The mixture is then diluted with normal butanol to 72% nonvolatile by weight.

Preparation C: Preparation of Binder Emulsion with Dodecenylsuccinic Anhydride (DDSA) and Phosphorylated Epoxy Resin The following materials are combined in a 3-L flask with an associated heating mantle: diglycidyl ether of bisphenol A, (18.03 parts by weight), bisphenol A, (4.1 parts by weight), phenol (1.41 parts by weight), and propylene glycol n-butyl ether (0.36 parts by weight). While stirring, the temperature is raised to 257° F. (125° C.). Subsequently, triphenylphosphine (0.04 parts by weight) is added and the exotherm is recorded as 392° F. (200° C.). The mixture is then allowed to cool to 275° F. (135° C.), and a weight per epoxide (WPE) determination (target=525±25) is conducted after 45 minutes and is 544. After cooling to 194° F. (90° C.) and turning off the heating mantle, 1.73 parts by weight of diethanolamine is introduced and the exotherm is recorded as 226.4° F. (108° C.). The reaction mixture is allowed to stir for an additional 30 minutes at 221° F. (105° C.) after reaching exotherm. After stirring for 30 minutes, 3-dimethylaminopropylamine is added at 221° F. (105° C.) (0.84 parts by weight), and the exotherm is recorded as 273.2° F. (134° C.). The mixture is stirred for an additional hour. A solution of DDSA (1.13 parts by weight) in toluene (0.34 parts by weight) is added at 212° F. (100° C.). The mixture is heated to 257° F. (125° C.) and stirred for 1.5 hours. A 2.36 parts by weight of PLURACOL® 710R (sold by BASF Corporation) is added followed by the crosslinker (a blocked isocyanate based on polymeric MDI and monofunctional alcohols) (13.6 parts by weight). The mixture is stirred for 30 minutes at 221-230° F. (105-110° C.). Preparation A, the phosphorylated epoxy resin, (6.7 parts by weight) is added and the mixture is stirred for an additional 15 minutes at 221-230° F. (105-110° C.).

After achieving a homogeneous mixture, the resins and crosslinker blend is added to an acid/water mixture, under constant stirring, of deionized water (34.95 parts by weight) and formic acid (88%) (0.62 parts by weight). After thoroughly mixing all components using a metal spatula, the solids are further reduced by addition of water (18.55 parts by weight). A flow-additive package (2.51 parts by weight) is added to the acid mixture.

Preparation D: Preparation of Binder Emulsion with the Carboxylated Phosphorylated Epoxy Resin The following materials are combined in a 3-L flask with an associated heating mantle: diglycidyl ether of bisphenol A, (18.03 parts by weight), bisphenol A, (4.1 parts by weight), phenol (1.41 parts by weight), and propylene glycol n-butyl ether (0.36 parts by weight). While stirring, the temperature is raised to 257° F. (125° C.). Subsequently, triphenylphosphine (0.04 parts) is added and the exotherm is recorded as 392° F. (200° C.). The mixture is then allowed to cool to 275° F. (135° C.), and a weight per epoxide (WPE) determination (target 525±25) is conducted after 1 hour and is 524. After cooling to 194° F. (90° C.) and turning off the heating mantle, 2.36 parts by weight of PLURACOL® 710R (sold by BASF Corporation) is added, then 1.73 parts of diethanolamine is introduced; the exotherm is recorded as 237.2° F. (114° C.). The reaction mixture is allowed to stir for an additional 30 minutes at 221° F. (105° C.) after reaching exotherm. After stirring for 30 minutes, 3-dimethylaminopropylamine is added at 221° F. (105° C.) (0.84 parts), and the exotherm is recorded as 291.2° F. (144° C.). The mixture is stirred for an additional hour. A crosslinker (a blocked isocyanate based on polymeric MDI and monofunctional alcohols) (13.6 parts by weight) is added. The mixture is stirred for 30 minutes at 221-230° F. (105-110° C.). Preparation B, the carboxylated phosphorylated epoxy resin with DDSA, (8.7 parts), is added and the mixture is stirred for an additional 15 minutes at 221-230° F. (105-110° C.).

After achieving a homogeneous mixture, the resins and crosslinker blend is added to an acid/water mixture, under constant stirring, of deionized water (34.95 parts by weight) and formic acid (88%) (0.62 parts by weight). After thoroughly mixing all components using a metal spatula, the solids are further reduced by addition of water (18.55 parts by weight). A flow-additive package (2.51 parts by weight) is added to the acid mixture.

Preparation E: Grinding Resin Solution

In accordance with EP 0 505 445 B1, an aqueous-organic grinding resin solution is prepared by reacting, in the first stage, 2598 parts of bisphenol A diglycidyl ether (epoxy equivalent weight (EEW) 188 g/eq), 787 parts of bisphenol A, 603 parts of dodecylphenol, and 206 parts of butyl glycol in a stainless steel reaction vessel in the presence of 4 parts of triphenylphosphine at 130° C. until an EEW (epoxy equivalent weight) of 865 g/eq is reached. In the course of cooling, the batch is diluted with 849 parts of butyl glycol and 1534 parts of D.E.R® 732 (polypropylene glycol diglycidyl ether, DOW Chemical, USA) and is reacted further at 90° C. with 266 parts of 2,2'-aminoethoxyethanol and 212 parts of N,N-dimethylaminopropylamine. After 2 hours, the viscosity of the resin solution is constant (5.3 dPas; 40% in Solvenon® PM (methoxypropanol, BASF/Germany); cone and plate viscometer at 23° C.). It is diluted with 1512 parts of butyl glycol, the base groups are partly neutralized with 201 parts of glacial acetic acid, and the product is diluted further with 1228 parts of deionized water and discharged. This gives a 60% strength aqueous-organic resin solution whose 10% dilution has a pH of 6.0. The resin solution is used in direct form for paste preparation.

Preparation F: Pigment Paste

A premix is first formed from 125 parts of water and 594 parts of the grinding resin solution of Preparation E. Then 7.3 parts of acetic acid, 9 parts of Tetronic® 901 surfactant, 7.5 parts of carbon black, 120 parts of aluminum hydrosilicate ASP 200 clay (Langer & Co./Germany), 547 parts of titanium dioxide TI-PURE® R 900 (DuPont, USA), 43.6 parts of di-n-butyl tin oxide, and 46.7 parts of bismuth subsalicylate are added. The mixture is predispersed for 30 minutes under a high-speed dissolver stirrer. The mixture is subsequently dispersed in a small laboratory mill (Motor Mini Mill, Eiger Engineering Ltd, Great Britain) until it measures a Hegmann fineness of less than or equal to 12 µm; it is then adjusted to final solids content with additional water. A separation-stable pigment paste is obtained. Solids content: 70.0% by weight (1 hour at 110° C.).

Example 1

A bath is prepared by combining 986 parts Preparation D, 147.8 parts preparation F, and 1366 parts deionized water. The water and Preparation D resin emulsion are combined in a container with constant stirring, and Preparation F is added with stirring. The bath solid contents are 19% by weight.

Example 1 was tested by coating both phosphated and bare cold rolled steel 4-inch-by-6-inch test panels at 100-225 volts (0.5 ampere) in Example 1 at bath temperatures from 88-98° F. (31-36.7° C.) for 2.2 minutes and baking the coated panels for 28 minutes at 350° F. (177° C.). The deposited, baked coating has a filmbuild of about 0.8 mil (20 µm). Three panels were coated for each temperature and substrate.

Control panels were prepared as described above but using U32AD500 (commercial product sold by BASF Corporation).

After baking, each panel is scribed directly down the middle and tested in accordance with GMW14872. The test description is as follows: For 8 hours the test panels are subjected to contaminant spray of salt solution consists of 0.5% NaCl, 0.1% $CaCl_2$ and 0.075% $NaHCO_3$ at 25° C. and 45% relative humidity (RH). Next the test panels are subjected to 49° C. and a RH of 100% for 8 hours, followed by a dry stage where panels are subjected to 60° C. at <30% RH for 8 hours. The cycle is repeated until cold rolled steel (CRS) (per SAEJ2329 CRIE, uncoated) coupons reach 3.9 gm weight loss. After completion, each panel is rinsed with water and scraped with a metal spatula. The corrosion is measured as the average of scribe width of selected points along the scribe length.

Results are as tested on bare cold rolled steel.

|  | GMW14872 avg. mm Scribe width |
| --- | --- |
| Example 1 | 8.7 |
| Control | 11.7 |

The description is merely exemplary in nature and, thus, variations that do not depart from the gist of the disclosure are a part of the invention. Variations are not to be regarded as a departure from the spirit and scope of the disclosure.

What is claimed is:

1. An aqueous coating composition comprising a binder, the binder comprising
   (a) a phosphorylated resin,
   (b) a crosslinker for the phosphorylated resin,
   (c) optionally a second, amine-functional resin reactive with the crosslinker, wherein the second, amine-functional resin does not include phosphorous-containing groups,
   wherein the phosphorylated resin or the crosslinker comprises, or the second amine-functional resin is included and comprises, a carboxyl group separated by from 2 to 4 carbons from an ester group, wherein the carboxyl group separated by from two to four carbons from an ester group has a structure

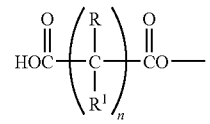

in which n is 2, 3, or 4 and each of R and $R^1$ is independently selected from H and hydrocarbyl groups having one to four carbon atoms.

2. An aqueous coating composition according to claim 1, wherein the phosphorylated resin is an epoxy resin.

3. An aqueous coating composition according to claim 1, wherein the phosphorylated resin comprises a monophosphate ester group, a monophosphonic acid ester group, or both.

4. An aqueous coating composition according to claim 1, wherein the phosphorylated resin comprises a diphosphate ester group, a diphosphonic acid ester group, or both.

5. An aqueous coating composition according to claim 1, wherein the phosphorylated resin comprises, on average, more than one phosphorous atom per molecule.

6. An aqueous coating composition according to claim 1, wherein the carboxyl group separated by from 2 to 4 carbons from an ester group is the reaction product of a cyclic anhydride with a hydroxyl group.

7. An aqueous coating composition according to claim 1, wherein the phosphorylated resin is electrodepositable.

8. An aqueous coating composition according to claim 1, wherein the phosphorylated resin comprises the carboxyl group separated by from two to four carbons from an ester group.

9. An aqueous coating composition according to claim 1, wherein the binder comprises the second resin that is amine-functional.

10. An aqueous coating composition according to claim 1, wherein the phosphorylated resin is an acrylic resin.

11. An aqueous coating according to claim 1, wherein the binder is electrodepositable.

12. An aqueous coating according to claim 11, wherein the binder is cathodically electrodepositable.

13. An aqueous coating composition according to claim 1, wherein the phosphorylated resin comprises at least one group

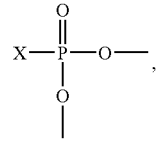

in which X is a hydrogen, a monovalent hydrocarbon, or an oxygen atom having a single covalent bond to the phosphorous atom, and each oxygen atom has a covalent bond to a hydrogen atom, an alkyl group, an aryl group, an alkylaryl group, an arylalkyl group, or the amine-functional resin, with the caveat that at least one oxygen atom has a covalent bond to the resin.

14. An aqueous coating composition according to claim 13, wherein the phosphorylated resin is electrodepositable.

15. An aqueous coating composition according to claim 13, further comprising the second, amine-functional resin.

16. A method of coating a metal automotive vehicle body, comprising:
    (a) cleaning the metal automotive vehicle body;
    (b) placing the cleaned metal automotive vehicle body into an aqueous coating composition according to claim 1;
    (c) connecting the metal automotive vehicle body as a cathode in an electric circuit and passing a current through the aqueous electrodeposition coating composition to deposit a coating layer onto the metal automotive vehicle body.

17. A method of coating a metal automotive vehicle body according to claim 16, wherein the metal automotive vehicle body is free of a phosphate pre-treatment.

18. A method of coating a metal automotive vehicle body according to claim 16, wherein the phosphorylated resin comprises a phosphate ester of a polyepoxide resin, a phosphonic acid ester of a polyepoxide resin, or a combination thereof.

19. A method of coating a metal automotive vehicle body according to claim 16, wherein the phosphorylated resin comprises a diphosphate ester of a polyepoxide resin, a diphosphonic acid ester of a polyepoxide resin, or a combination thereof.

20. A method of coating a metal automotive vehicle body according to claim 16, wherein the phosphorylated resin comprises, on average, more than one phosphorous atom per molecule.

21. A method of coating a metal automotive vehicle body according to claim 16, wherein the phosphorylated resin is an epoxy resin.

22. A method of coating a metal automotive vehicle body according to claim 21, wherein the phosphorylated epoxy resin comprises the carboxyl group separated by from 2 to 4 carbons from an ester group.

* * * * *